United States Patent [19]

Gehin et al.

[11] Patent Number: 5,439,599
[45] Date of Patent: Aug. 8, 1995

[54] PROCESS FOR TREATING PHOTOGRAPHIC EFFLUENTS BY MEANS OF ULTRAVIOLET RADIATION AND HYDROGEN PEROXIDE

[75] Inventors: Guy M. Gehin, Ozoir-La-Ferriere; Oliver A. G. Caillault, Chalon-Sur-Saone, both of France

[73] Assignee: Eastman Kodak Company, Rochester, N.Y.

[21] Appl. No.: 231,216

[22] Filed: Apr. 22, 1994

[30] Foreign Application Priority Data

Apr. 30, 1993 [FR] France .................. 93 05412

[51] Int. Cl.⁶ .............................. C02F 1/48
[52] U.S. Cl. ........................ 210/748; 210/759
[58] Field of Search ................... 210/759, 748

[56] References Cited

U.S. PATENT DOCUMENTS

| | | | |
|---|---|---|---|
| 4,012,321 | 3/1977 | Koubek | 210/748 |
| 4,128,424 | 12/1978 | Geyken et al. | 210/759 |
| 4,906,387 | 3/1990 | Pisani | 210/748 |
| 5,238,581 | 8/1993 | Frame et al. | 210/748 |

FOREIGN PATENT DOCUMENTS 2303766 11/1976 France .
9203562 3/1992 France .
91/18671 12/1991 WIPO .

OTHER PUBLICATIONS

*Journal of the American Chemical Society,* Chapter 6, 1990, pp. 77–99.

Primary Examiner—Neil McCarthy
Attorney, Agent, or Firm—John R. Everett

[57] ABSTRACT

The present invention relates to a process for eliminating the organic compounds from aqueous effluents having a chemical oxygen demand (COD) greater than 5 g/l.

The process consists of treating the effluents with a sufficient quantity of light energy originating from a polychromatic UV source in the presence of $H_2O_2$. The quantity of oxygen provided by the hydrogen peroxide expressed in grams per liter is between 0.5 and 3 times the COD of the effluent to be treated and the pH is equal to or less than 10.5.

This process applies to photographic effluents.

12 Claims, No Drawings

5,439,599

PROCESS FOR TREATING PHOTOGRAPHIC EFFLUENTS BY MEANS OF ULTRAVIOLET RADIATION AND HYDROGEN PEROXIDE

The present invention relates to a process for treating liquid effluents containing organic compounds which it is desired to destroy before discharging them into the drains. Liquid effluents is taken to mean all kinds of waste water of industrial origin. This process applies particularly well to liquid photographic effluents in aqueous solution originating from the processing of films and photographic papers.

There are many works on the treatment of liquid effluents, such as color photographic development baths or solutions, the majority using peroxides, hydrogen peroxide or activated carbon.

For example, the French application registered under the No 9203562 and filed on 19 Mar. 1992 can be cited, which concerns a process comprising two oxidation stages respectively in an alkaline medium and in a neutral medium and a subsequent absorption treatment.

Although this process is very effective in reducing the COD (chemical oxygen demand expressed in g $O_2$/l of solution) of photographic effluents, it would be desirable to find new processes which are simpler to use, preferably in a single stage and in which the formation of additional salts consequent upon readjustments of the pH would be avoided.

Thus one of the objects of the present invention is to reduce the COD of aqueous effluents by means of a simple and effective process in which the action of hydrogen peroxide is combined with ultraviolet radiation.

It is known that the combined action of UV radiation and $H_2O_2$ may be combined to eliminate small quantities of oxidizable matter in polluted water.

For example, the French patent application 2303766 describes the elimination of cyanides or phenols from polluted water by means of a treatment combining UV radiation and $H_2O_2$. In order to eliminate cyanides, preferably a high-pressure mercury lamp with a power of 450 W is used, the process is carried out at pH of 9.5 and with a hydrogen peroxide concentration such that the $H_2O_2$/CN ratio is less than 1. In order to eliminate the phenols from water comprising 100 ppm of phenol, the process is carried out at a pH of 6 to 8 and with a low-pressure mercury lamp with a power of 15 W.

An article by H M Castrantas and R D Gibilisco, published in Chapter 6 pages 77–99 of the Journal of the American Chemical Society 1990, summarises the known uses of hydrogen peroxide for destroying pollutants such as phenol compounds at concentrations of between 100 and 1000 ppm. According to this article, the UV/$H_2O_2$ combination is much more effective in destroying phenols and substituted phenols than UV radiation alone, $H_2O_2$ alone or Fenton's reagent (Fe+$H_2O_2$).

U.S. Pat. No. 4,012,321 describes the destruction of organic pollutants in effluents containing mainly acetic acid (or acetate) in the presence of $H_2O_2$ with a source of 260 nm ultraviolet light. The UV/$H_2O_2$ treatment enables the COD to be reduced initially from 4 g/l to 0.64 g/l.

The patent WO 91/18671 describes a process for destroying aromatic compounds in solid particles. In this process a UV/$H_2O_2$ combination is used with a high UV energy source.

Thus the prior art makes no mention of UV/$H_2O_2$ treatments making it possible to treat aqueous effluents having a high initial COD, greater than 5 g/l, and, in particular, effluents from photographic baths for obtaining colour or black and white images, or else washing waters comprising organic compounds forming part of solutions for processing films and photographic papers which normally have a COD greater than 10 g/l.

Photographic effluents have the particular feature of having a very alkaline pH and very complex formulations. For example, developments baths essentially comprise, in aqueous solution:

1) an organic reducing agent (or developer) intended to reduce the silver halide, such as hydroquinone, genol, phenidone, para-aminophenol, diaminophenol, glycine, pyrogallol or para-phenylene diamine. A list of color developers will be found in Research Disclosure of December 1989, Article 308119 Chapter XX;
2) an alkaline,substance for maintaining a high pH, such as sodium or potassium carbonate, sodium metaborate, borax, caustic soda, potash or phosphates.

The development solution may also contain:

3) an oxidation preservative, usually anhydrous sodium sulphite, which also acts as a regulator for the development;
4) an anti-fogging retarder, usually potassium iodide or bromide or else an organic anti-fogging agent such as p-nitrobenzimidazole nitrate, benzotriazole or diphenyltetrazole disulphide;
5) a solvent for silver halides, which may the sulphite itself or potassium thiocyanate, sodium hyposulphite, ammonium hydroxide, a thioalcohol or a mercapto-acid;
6) an antical agent, such as sequestering agents of the mineral type such as sodium hexametaphosphate or tetraphosphate, or of the organic type such as the salts of ethylenediaminetetracetic acid;
7) a wetting agent;
8) a product inhibiting the deposition of silver to retard the formation of silver sludge, such as dithiocarboxyl acid, benzopyrazol derivatives, organic polymers or polyacrylamides;
9) an anti-foaming agent;
10) an antiseptic;
11) an organic solvent, alcohol or glycol;
12) a hardening agent such as glutaric dialdehyde;
13) a permeability agent such as benzyl alcohol.

The photographic effluents therefore comprise large quantities of organic compounds. The COD of photographic effluents normally varies between 10 and 120 g/l and the total organic carbon (TOC) content between 3 and 50 g/l.

The problem of the present invention is therefore to reduce significantly the COD of the aqueous effluents having a high COD.

This problem is resolved by a process for eliminating organic compounds in aqueous effluents with a chemical oxygen demand (COD) greater than 5 g/l by means of irradiation with ultraviolet light in the presence of hydrogen peroxide, characterised in that (1) the ultraviolet light comes from a polychromatic source and the quantity of light energy provided by this source is sufficient to allow the desired reduction in the COD, (2) the quantity of oxygen provided by the hydrogen peroxide expressed in grams per liter is between 0.5 and 3 times the COD of the effluent to be treated, (3) the pH of the treatment is equal to or less than 10.5.

The treatment according to the invention allows effective and economical destruction of the organic compounds in the effluents and prevents the formation of sludge or undesirable compounds such as, for example, cyanides or chlorinated organic compounds.

In the process according to the invention, a polychromatic source is used, emitting in the wavelength range 200 to 600 nm, for example a medium or high-pressure mercury vapour lamp.

The energy supplied by such a lamp causes activation of both the organic compounds and the hydrogen peroxide.

An important characteristic of the process according to the invention is the pH range to be used. In fact, as stated above, photographic effluents are very basic and have, for example, a pH of around 12. The addition of $H_2O_2$ in an appropriate quantity lowers the pH but sometimes insufficiently. An excessively high pH causes a decomposition of $H_2O_2$ which is not completely efficacious, and an excessively low pH requires the solution then to be neutralised before discharging to drain, which results in the formation of undesirable salts. The process according to the invention is applicable to solutions having a pH equal to or less than 10.5 but, for the reasons indicated above, a pH of between 6 and 9 is preferred.

The quantity of hydrogen peroxide to be used in the present invention is determined so that the quantity of oxygen provided by the hydrogen peroxide expressed in g/l of solution is between 0.5 and 3 times the COD. In practice a quantity of $H_2O_2$ is used which is slightly in excess with respect to the COD and preferably 1.5 times the COD.

One of the problems encountered with photographic solutions in that they have, before treatment, a high optical density, for example of the order of 14 at a wavelength of 375 nm. It is necessary for the UV light to be able to penetrate them sufficiently for the UV/-$H_2O_2$ interaction to be able to occur. For this purpose devices are used in which the distance between the light source and the solution is as small as possible, so as to give a better penetration of the UV radiation within the solution.

An essential parameter in the present invention is the quantity of light energy to be supplied to the solution in order to obtain the desired reduction in the COD. Since some standards for discharging effluent require a COD value as low as 0.5 g/l, a reduction which may be as much as 95% and even more may be desirable. The quantity of light energy necessary to reduce the COD by a given percentage is a function of the value of this percentage.

Surprisingly, in the process of the present invention, the quantity of light energy necessary for reducing the COD by a given percentage is independent of the initial COD of the effluent to be treated.

To obtain this energy, it is known that either a lamp having a high power over a short time can be used, or that a low-power lamp can be used for a longer time.

"Light energy" means the actual energy imparted to the solution by the UV source. This energy, expressed in watt hour per liter of solution (Wh/l) is approximately one third of the product P.h/l, where P is the electrical power of the UV lamp expressed in watts, as given by the manufacturer, h the time in hours and l the volume of the solution in liters.

For guidance, it has been found experimentally that, if an effluent with an initial COD of 10 to 120 g/l is treated with a quantity of oxygen supplied by the hydrogen peroxide of 1.5 times the COD, at a pH of between 6 and 9, the quantity of light energy supplied by a medium-power UV lamp required to reduce the COD by 95% must be greater than 2000 Wh/l, whilst this energy must be greater than 300 Wh/l to reduce the COD by 50%.

The invention will be understood better with reference to the following examples.

EXAMPLE 1

In this example, the liquid effluent to be treated is a color photographic development bath used for the E6 processing of reversal films. This effluent comprises, in aqueous solution, the following compounds:

| | |
|---|---|
| DESQUEST 2006$^R$ | 4.75 g/l |
| $H_3PO_4$ (85%) | 9.08 g/l |
| Anhydrous $Na_2SO_3$ | 6.75 g/l |
| Citrazinic acid | 0.56 g/l |
| Kodak CD3$^R$ developer** | 10.45 g/l |
| KODAK Silver Halide Solvent HS-104R | 0.86 g/l |
| NaBr | 0.55 g/l |
| KI | 0.04 g/l |
| and KOH in order to obtain a pH of 11.97. | |

*Pentasodium salt of aminotris(methylphosphoric) acid
**4-amino-3-methyl-N-ethyl-N-beta-(methanesulphonamido) ethylaniline sulphate (3/2 $H_2SO_4$, $H_2O$).

The characteristics of the effluent to be treated are as follows:

| | |
|---|---|
| Initial pH | @ 12 |
| Optical density at 450 nm | 0.41 |
| Optical density at 375 nm | 13.73 |
| Initial COD | 14.4 g/l |
| Initial TOC | 5.8 g/l |

In this example the operation is carried out in batch mode (Batch 500 device). To this end, 500 cc of the effluent is poured into a cylindrical receptacle under agitation, and then various quantities of 50% $H_2O_2$ expressed in cc/liter of corresponding solution in Examples 2-3 and 5-10 at 1.5 times the COD, and 0.75 times the COD in Example 4. The pH is adjusted if necessary by means of sulphuric acid, and then a mercury vapour lamp of the medium pressure type with an electrical power of 150 W (TQ150 sold by HERAEUS) is immersed. The light power imparted is approximately 50 W. The temperature is not controlled.

Table I below summarises the data relating to the quantity of 50% $H_2O_2$ added in cc/l of solution ($H_2O_2$), the pH, the duration of irradiation by UV (UV (h)) and the light energy supplied to the solution (Energy Wh/l). The chemical oxygen demand (COD g/l), total organic carbon (TOC g/l), optical density at 375 nm ($OD_{375}$), optical density at 450 nm ($OD_{450}$) and residual quantity of $H_2O_2$ in cc/l (residual $H_2O_2$) are measured for the solutions after treatment after leaving the solutions to stand for a few hours at ambient temperature. The value of the COD after treatment is a corrected value (the value of the COD relating to residual $H_2O_2$ has been subtracted from the experimental value, given that 1 cc of residual 50% $H_2O_2$ represents a COD of 0.256 g under the conditions under which the COD is determined).

Solution 1 (reference) represents the effluent to be treated. The values given in Table 1 for solution 1 relate to effluent before treatment.

The other solutions were treated by means of the process according to the invention, except for solution 3, which did not undergo UV radiation. For solutions 3 and 4 the duration of the reaction is 5 hours. For solution 4, the UV irradiation took place during the first 2.5 hours.

According to these results it can be seen, by comparing solution 2 with solution 3, that the UV irradiation affords a greater reduction of COD, TOC, $D_{375}$ and $OD_{430}$ than when $H_2O_2$ is used alone. It can also be seen that the quantity of residual $H_2O_2$ is much lower in solution 2 than in solution 3, which shows that the reaction is more complete in the case of solution 2.

Comparing solutions 2 and 4, it can be seen that, by dividing by 2 both the quantity of $H_2O_2$ put in the solution and the UV irradiation time, a reduction in the COD and TOC of approximately one half is obtained, together with a higher optical density.

Comparing respectively solutions 5 and 8 and solutions 6 and 9, it can be seen that the irradiation time and consequently the light energy is a decisive factor with regard to the reduction in the COD and TOC.

Comparing the series of experiments shown in the table by solutions 7–10, it can be seen that reducing the pH enables better results to be obtained with regard to the reduction in the COD and TOC. However, the preferred pH range remains 6 to 9, since the effluents with this pH may be directly discharged to drain without it being necessary to neutralise them.

TQ150 lamp. The thickness of the solution around the lamp is a few millimeters.

In this example, the initial COD is 14.4 g/l and the TOC 5.8 g/l; the pH of the solution to be treated is 6.3; the quantity of hydrogen peroxide added is 80 cc/l of 50% $H_2O_2$; the temperature is not controlled.

In Table II, COD and TOC represent respectively the COD and TOC of the effluents after treatment, and % COD and % TOC represent respectively the percentage reduction of the COD and TOC. Residual $H_2O_2$ is expressed in cc/l of solution.

The results in Table II show that a reduction of more than 99% is obtained with a light energy equal to or greater than 2200 Wh/l whatever the device used, whilst a reduction in the COD of less than 50% is obtained with a light energy of 300 Wh/l.

EXAMPLE 3

This example shows that the percentage reduction in the COD and TOC is independent of the initial value of the COD and TOC for a given light energy value.

In this example a device of the Batch 500 type is used, into which 0.7 liters of solution is poured. A quantity of $H_2O_2$ corresponding to 1.5 times the initial CODs of the solutions to be treated is introduced.

The results obtained under the same conditions as before are set out in Table III.

In this table, $COD_{init}$ and $TOC_{init}$ represent respectively the COD and TOC before treatment, and % COD and % TOC represent respectively the percentage reduction in the COD and TOC. $H_2O_2$ and residual $H_2O_2$ are expressed in cc/l of solution.

Solutions 1 to 4 are color developer solutions used in the processing of colour films and papers and solutions

TABLE I

| Solution | $H_2O_2$ | pH | UV (h) | Energy Wh/l | COD g/l | TOC g/l | $OD_{375}$ | $OD_{450}$ | Residual $H_2O_2$ |
| --- | --- | --- | --- | --- | --- | --- | --- | --- | --- |
| 1 reference | 0 | 12 | 0 | 0 | 14.4 | 5.8 | 13.73 | 0.41 | — |
| 2 | 80 | 10.3 | 5 | 500 | 3.8 | 2.13 | 0.16 | 0.006 | 3.9 |
| 3 comp | 80 | 10.3 | 0 | 0 | 9.81 | 3.36 | 0.75 | 0.20 | 16.78 |
| 4 | 40 | 10.3 | 2.5 | 250 | 7.65 | 3.29 | 0.36 | 0.1 | 3.80 |
| 5 | 80 | 8.3 | 5 | 500 | 3.25 | 1.35 | 0.08 | 0.01 | 15 |
| 6 | 80 | 6.3 | 5 | 500 | 5.2 | 1.95 | 0.11 | 0.02 | 25 |
| 7 | 80 | 10.3 | 8 | 800 | 3.7 | 1.8 | — | — | 2.30 |
| 8 | 80 | 8.3 | 8 | 800 | 2.4 | 2.3 | — | — | 14 |
| 9 | 80 | 6.3 | 8 | 800 | 2.4 | 1.2 | — | — | 18.5 |
| 10 | 80 | 4.3 | 8 | 800 | 1.6 | 0.8 | 0.1 | 0.07 | 16.5 |

EXAMPLE 2

In this example, various treatments are carried out on one and the same effluent, varying the light energy between 300 and 2500 Wh/l, and the corresponding reduction in COD and TOC is measured.

Three different devices are used:

Batch 500 is the device of Example 1, that is to say a receptacle containing 500 cc of solution under agitation, in which a UV source with a 50 W light power is immersed (HERAEUS TQ150 lamp). The thickness of the solution around the lamp is several centimeters.

Batch 100 is a reactor containing 100 cc of solution. The UV source is the same lamp as in Batch 500. The thickness of the solution around the lamp is a few millimeters.

Semibatch 500 is a device in which 500 cc of solution circulates continuously in a receptacle containing 100 cc of solution equipped with the HERAEUS 5 to 8 are solutions used for the black and white development of reversal papers or radiography films.

Solution 1, used in the C41 processing of KODACOLOR films, comprises principally, as organic products, CD4 (p-phenylenediamine) and hydroxylamine sulphate.

Solution 2, used in the RA4 processing of Ektacolor paper, comprises principally, as organic products, triethanolamine and CD3 (p-phenylenediamine).

Solution 3, used in color development in the R3 processing of Ektachrome paper, comprises mainly, as organic products, CD3, diethylene glycol, benzyl alcohol and hydroxylamine.

Solution 4, used in color development in the E6 processing of reversal films, has the composition indicated previously.

Solution 5, used in the first black and white development of Ektachrome paper in R3 processing, comprises, mainly as organic products, hydroquinone and a phenidone.

Solution 6, used in RP X-Omat processing for medical X-rays, comprises mainly, as organic products, diethylene glycol, hydroquinone, a phenidone, acetic acid and glutaraldhyde.

Solution 7, used in RA30 processing for medical X-rays, comprises mainly, as organic products, diethylene glycol, hydroquinone, a phenidone, acetic acid and pentenic acid.

The results in Table III show that the reduction in the COD does not depend on the initial COD for a given energy value since, starting from initial CODs varying from 11.3 to 114 g/l, the COD is reduced by 54 to 84% for an energy of 360 Wh/l.

We claim:

1. Process for eliminating organic compounds in aqueous photographic effluents with a chemical oxygen demand (COD) greater than 5 g/l and thereby reduce the COD of said effluents to a desired level, by means of irradiation with ultraviolet light in the presence of hydrogen peroxide comprising subjecting the aqueous photographic effluents ultraviolet light coming from a polychromatic source, the quantity of light energy provided by this source being sufficient to allow the desired reduction in COD; the quantity of oxygen provided by the hydrogen peroxide expressed in grams per liter being between 0.5 and 3 times the COD of the effluent to be treated; and the pH of the treatment being equal to or less than 10.5.

2. Process according to claim 1, in which the ultraviolet polychromatic light source emits between 600 and 200 nm.

3. Process according to claim 2, in which the ultraviolet light source is a medium or high-pressure mercury vapour lamp.

4. Process according to claim 1, in which the pH is between 6 and 9.

5. Process according to claim 1, in which the quantity of oxygen provided by the hydrogen peroxide expressed as g/l is 1.5 times the COD.

6. Process according to claim 1 for reducing by 50% the COD of an effluent with a COD of between 10 g/l and 120 g/l, in which the ultraviolet light is supplied by a medium-pressure mercury vapour lamp, the quantity of oxygen provided by the hydrogen peroxide is 1.5 times the COD, the pH is between 6 and 9 and the quantity of light energy is greater than 300 Wh/l.

7. Process according to claim 1 for reducing by 95% the COD of an effluent with a COD of between 10 g/l and 120 g/l, in which the ultraviolet light is supplied by a medium-pressure mercury vapour lamp, the quantity of oxygen provided by the hydrogen peroxide is 1.5 times the COD, the pH is between 6 and 9 and the quantity of light energy is greater than 2000 Wh/l.

8. Application of the process according to any one of the preceding claims to the treatment of photographic effluents having a COD of between 10 g/l and 120 g/l.

9. Application according to claim 8, in which the effluents come from color development baths for silver halide photographic products.

10. Application according to claim 9, in which the effluents contain para-phenylene diamines.

11. Application according to claim 8 to the treatment of photographic effluents originating from the black and white development of silver halide photographic products.

12. Application according to claim 11, in which the effluents contain hydroquinone type developing agents.

* * * * *